US008688516B2

(12) United States Patent
Shimizu et al.

(10) Patent No.: US 8,688,516 B2
(45) Date of Patent: Apr. 1, 2014

(54) METHODS AND APPARATUS FOR INTEGRATING VOLUMETRIC SALES DATA, MEDIA CONSUMPTION INFORMATION, AND GEOGRAPHIC-DEMOGRAPHIC DATA TO TARGET ADVERTISEMENTS

(75) Inventors: Jerome Shimizu, Jersey City, NJ (US); Ryan Chase Miller, Maineville, OH (US); Georgi Y. Georgiev, Morton Grove, IL (US); Jingyi Wu, Ossining, NY (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 9 days.

(21) Appl. No.: 13/047,541

(22) Filed: Mar. 14, 2011
(Under 37 CFR 1.47)

(65) Prior Publication Data
US 2012/0053991 A1    Mar. 1, 2012

Related U.S. Application Data

(60) Provisional application No. 61/314,019, filed on Mar. 15, 2010.

(51) Int. Cl.
*G06Q 30/00*    (2012.01)
(52) U.S. Cl.
USPC .................. 705/14.27; 705/14.23; 705/14.25; 709/219; 725/46
(58) Field of Classification Search
None
See application file for complete search history.

(56) References Cited

U.S. PATENT DOCUMENTS

| | | | |
|---|---|---|---|
| 5,675,510 | A | 10/1997 | Coffey et al. |
| 6,029,139 | A | 2/2000 | Cunningham et al. |
| 6,108,637 | A | 8/2000 | Blumenau |
| 6,460,079 | B1 | 10/2002 | Blumenau |
| 6,493,327 | B1 | 12/2002 | Fingerhut |
| 6,968,179 | B1 | 11/2005 | De Vries |
| 7,028,072 | B1 | 4/2006 | Kilger et al. |
| 7,155,508 | B2 | 12/2006 | Sankuratripati et al. |
| 7,415,510 | B1 | 8/2008 | Kramerich et al. |
| 7,788,188 | B2 | 8/2010 | Kramer |

(Continued)

FOREIGN PATENT DOCUMENTS

| | | |
|---|---|---|
| JP | 2007058820 | 3/2007 |
| JP | 2007102340 | 4/2007 |
| WO | 2007002859 | 1/2007 |

OTHER PUBLICATIONS

Chen, Andy; "Behavioral Matchmaking, Part 3: GPS and Behavioral Targeting"; from website http://www.clickz.com; Nov. 24, 2004.*

(Continued)

*Primary Examiner* — Gurkanwaljit Singh
(74) *Attorney, Agent, or Firm* — Hanley, Flight and Zimmerman, LLC

(57) ABSTRACT

A disclosed example method involves generating a geographic-based consumption index for a product based on a first per-person sales volume of the product in a first cell of a plurality of geographic cells of a larger geographic area. The example method also involves generating a demographic-based consumption index for the product based on a second per-person sales volume of the product for a demographic group in the first cell. An advertisement to present to a person is selected based on an online web interest, a geographic location, and a demographic of the person and further based on the geographic-based consumption index and the demographic-based consumption index.

21 Claims, 9 Drawing Sheets

(56) References Cited

U.S. PATENT DOCUMENTS

| | | | |
|---|---|---|---|
| 7,841,526 B2 | 11/2010 | Hall | |
| 7,844,492 B2* | 11/2010 | Perkowski et al. | 705/14.4 |
| 7,849,154 B2 | 12/2010 | Grecco et al. | |
| 7,890,609 B2* | 2/2011 | Shkedi | 709/219 |
| 7,949,714 B1* | 5/2011 | Burnim | 709/206 |
| 8,219,638 B2* | 7/2012 | Weinberg et al. | 709/217 |
| 8,495,679 B2* | 7/2013 | Labeeb et al. | 725/46 |
| 2002/0107733 A1* | 8/2002 | Liu et al. | 705/14 |
| 2002/0174011 A1* | 11/2002 | Sanchez et al. | 705/14 |
| 2003/0009379 A1* | 1/2003 | Narasimhan et al. | 705/14 |
| 2003/0093792 A1* | 5/2003 | Labeeb et al. | 725/46 |
| 2003/0182188 A1* | 9/2003 | Duchow | 705/14 |
| 2005/0177449 A1 | 8/2005 | Temares et al. | |
| 2007/0061195 A1 | 3/2007 | Liu et al. | |
| 2007/0094076 A1* | 4/2007 | Perkowski et al. | 705/14 |
| 2008/0189169 A1 | 8/2008 | Turpin et al. | |
| 2008/0281711 A1* | 11/2008 | Bridges et al. | 705/14 |
| 2009/0070219 A1 | 3/2009 | D'Angelo et al. | |
| 2009/0089131 A1 | 4/2009 | Moukas et al. | |
| 2009/0138339 A1 | 5/2009 | Moukas et al. | |
| 2009/0222324 A1 | 9/2009 | Johnson | |
| 2009/0228359 A1* | 9/2009 | Cameron et al. | 705/14 |
| 2009/0234717 A1 | 9/2009 | Wiggins et al. | |
| 2009/0298480 A1 | 12/2009 | Khambete et al. | |
| 2010/0030646 A1 | 2/2010 | Riise et al. | |
| 2010/0063877 A1 | 3/2010 | Soroca et al. | |
| 2010/0070368 A1 | 3/2010 | Choi et al. | |
| 2010/0257023 A1 | 10/2010 | Kendall et al. | |
| 2011/0035273 A1 | 2/2011 | Parikh et al. | |
| 2011/0035280 A1 | 2/2011 | Fordyce, III et al. | |
| 2011/0035288 A1 | 2/2011 | Clyne | |
| 2011/0040655 A1 | 2/2011 | Hendrickson | |
| 2011/0276394 A1* | 11/2011 | Chan | 705/14.49 |

OTHER PUBLICATIONS

Battelle, John; "The Search—How Google and Its Rivals Rewrote the Rules of Business and Transformed Our Culture"; pp. 167-171; 2005.*

Draft Technical Report entitled "The Retail Store of the Future: Crest of the Third Wave" by Robert J. Corey, Ph.D. and John R. Spears, Ed.D., Jan. 15, 1997, pp. 1-45.*

Scientific publication entitled "Smart Catalogs and Virtual Catalogs" by Keller, Computer Sci.Dept., Stanford University, 1995, pp. 1-11.*

Product brochure for "NCR Web Kiosk Solutions" by NCR Corporation, www.ncr.com. 1999, pp. 1-14.*

Operating manual entitled "WEBDOX General Information Manual" by Premenos Corp., Concord, CA, 1996-1997, pp. 1-20.*

Hanson, Kara, Eve Worrall, and Virginia Wiseman. "Targeting services towards the poor: a review of targeting mechanisms and their effectiveness." Health, economic development and household poverty: from understanding to action(2007): 134-154.*

Patent Cooperation Treaty, "Written Opinion of the International Searching Authority," issued by the International Searching Authority in connection with PCT application No. PCT/US2011/028364, mailed Jul. 26, 2011 (4 pages).

Patent Cooperation Treaty, "International Search Report of the International Searching Authority," issued by the International Searching Authority in connection with PCT application No. PCT/US2011/028364, mailed Jul. 26, 2011 (3 pages).

Patent Cooperation Treaty, "International Preliminary Report on Patentability," issued by the International Searching Authority in connection with PCT application No. PCT/US2011/028364, mailed Sep. 18, 2012 (5 pages).

* cited by examiner

US 8,688,516 B2

METHODS AND APPARATUS FOR INTEGRATING VOLUMETRIC SALES DATA, MEDIA CONSUMPTION INFORMATION, AND GEOGRAPHIC-DEMOGRAPHIC DATA TO TARGET ADVERTISEMENTS

RELATED APPLICATIONS

This patent claims priority to U.S. Provisional Patent Application No. 61/314,019, filed on Mar. 15, 2010, which is hereby incorporated by reference herein in its entirety.

FIELD OF THE DISCLOSURE

The present disclosure relates generally to media delivery and, more particularly, to methods and apparatus for integrating volumetric sales data, media consumption information, and geographic-demographic data to target advertisements.

BACKGROUND

Product manufacturers, service providers, and advertisers often rely on advertising to make people aware of products or services. Such advertising can be viewed by people and elicit purchases by persons interested in the advertised products or services. However, for persons having little or no interest in the advertised products or services, such advertising is often ignored by such persons as irrelevant information.

DETAILED DESCRIPTION

Figure 1:
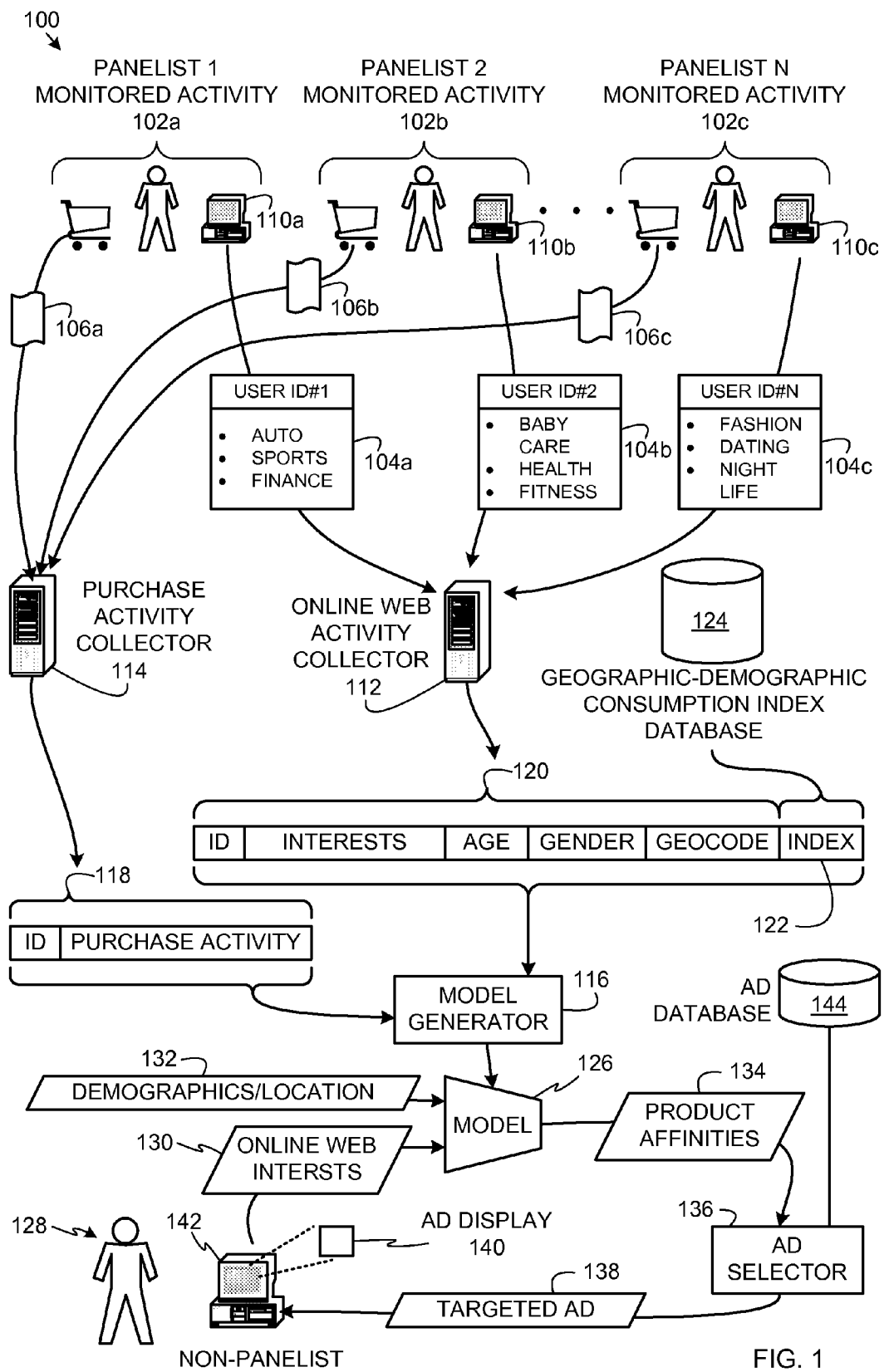
FIG. 1 is an overview of an example process that can be used to target online advertisements based on modeling of collected consumer characteristics indicative of Internet activity and purchasing behavior.

Example methods, apparatus, and/or articles of manufacture disclosed herein can be used to target advertisements using geographic and demographic information. For example, example methods, apparatus, and/or articles of manufacture disclosed herein can be used to generate relational models that identify correlations between geographic locations, demographic information, topical interests of online web media, and/or product purchasing behavior. Example methods, apparatus, and/or articles of manufacture disclosed herein can also be used to employ the relational models to identify product affinities of different users based on those users' geographic locations and topical interests of online web media. By identifying product affinities in this manner, such example methods, apparatus, and articles of manufacture can be used to identify products associated with high levels of affinity for different users and target advertisements to those users for those identified products. Targeting advertisements in this manner increases the relevancy of those advertisements to respective users and, thus, the effectiveness of those advertisements.

As described in detail below, some disclosed examples utilize a geographic-demographic consumption indices grid to identify consumption indices (e.g., affinity levels) for different products (e.g., by category, brand, sub-brand, type of product, etc.) at different geographic locations and for different demographic compositions of consumers. In illustrated examples disclosed herein, the geographic-demographic consumption indices grid is used to target individuals or groups of individuals (e.g., consumers) to deliver, for example, relevant advertising. Such targeting can be done through any media (e.g., Internet, television, print, radio, direct mail, etc.) employed by consumers in the geography or demographics associated with the geographic-demographic consumption indices grid. Such targeting based on geographic and demographic characteristics of consumers enables identifying substantially relevant prospects for different advertisement messages. Thus, the use of the geographic-demographic consumption indices grid substantially improves the likelihood of selecting a substantially relevant audience for a particular advertisement message.

In some examples, the targeting processes are applied directly to a particular person by mapping the geography and demographic composition of that person to a particular index cell in the geographic-demographic consumption indices grid. For example, smaller size marketing campaigns can be targeted by selecting the geographies and demographics within a larger geography that exhibit the desired consumption index characteristics (e.g., higher than average, lower than average, average, etc.) for targeting particular advertisement messages of the marketing campaigns. Advertisers can advantageously use such targeting techniques either by buying a smaller size campaign and reaching the same amount of brand/category dollars or by buying the same size campaign and reaching more brand/category dollars compared to running campaigns without employing these targeting techniques.

In other examples, the targeting is applied through the use of look-alike modeling. In look-alike modeling implementations, the values of the geographic-demographic consumption index cells are used as inputs and/or dependent variables to a predictive model (e.g., a predictive model generated using one or more of regression techniques, a decision tree, business rules, neural networks, etc.) with or without the use of additional variables. In some such examples, the data from the geographic-demographic consumption index cells is transformed into a shape suitable for the specific modeling method, and the resulting model more broadly enables processes to quantify the matching of real consumers to desired types of ideal audiences for respective advertisements. In some such examples, to further increase the relevancy of targeting advertisements, additional user-interest information about real prospective consumers is used in connection with the geographic-demographic consumption indices data. Such interest information can be based on, for example, online activity, search activity, interactions with advertisements, television viewing interests/patterns, survey answers, and/or any other available information.

The geographic-demographic consumption indices grid can be based on small or large geographies including territories within a country and/or territories spanning multiple countries across the world. In this manner, example methods, apparatus, and/or articles of manufacture disclosed herein can be used as a targeting vehicle to identify consumer prospects for delivering advertising campaigns. Targeting techniques disclosed herein can be used anywhere in the world for any type of media (e.g., television, Internet, print, radio, direct mail, etc.) for which persons can be identified based on the geography or demographics that are associated with the geographic-demographic consumption indices grid. For example, if an Internet protocol (IP) address or browser cookie is used to determine (e.g., via reverse look-up techniques) a geographic location (e.g., a postal code), the geographic location can be used to associate the IP address or browser cookie with a corresponding geographic-demographic consumption index cell. A decision can then be made about a consumer prospect relative to objectives of an advertisement campaign based on the values from the geographic-demographic consumption index cell or based on a look-alike model implemented using the geographic-demographic consumption indices data.

Although example methods, apparatus, and/or articles of manufacture are disclosed herein in connection with online advertisements through web pages, example methods, apparatus, and/or articles of manufacture may additionally or alternatively be used to target advertisements via different types of media including television, print media (e.g., newspapers, magazines, periodicals, journals, etc.), radio, and/or any other type of media. In addition, although example methods, apparatus, and/or articles of manufacture disclosed herein are described as targeting advertisements based on collected data indicative of consumer online web interests and product purchasing affinity, such example methods, apparatus, and/or articles of manufacture can additionally or alternatively be implemented to target advertisements based on other type(s) of collected data including data indicative of television viewership interests or habits, radio listenership interests or habits, print media readership interests or habits, etc.

In some example implementations, example techniques disclosed herein can be used to target advertising in a marketing mix model that uses observations of historical sales data for different geographic areas (e.g., zip codes) representative of household-level sales and mixed with retail-level data and national census data. In this manner, techniques disclosed herein may be advantageously used to observe or analyze volumetric sales trends at more granular geographic levels (e.g., sub-zip code levels) and use such volumetric sales data to target advertisements according to marketing mix models.

FIG. 1 is an overview of an example process 100 that can be used to target online advertisements based on modeling of collected consumer characteristics indicative of Internet activity and purchasing behavior. In the illustrated example, consumer characteristics indicative of Internet activity and purchasing behavior are collected from panelist members 102a-c who have consented to participate in one or more panels monitored by a market research entity for the express purpose of market research. In other examples, panelist members 102a-c may instead be registered users of rewards programs or other services that are not advertised as being for the express purpose of market research but that track Internet activity and/or purchasing behavior of such registered users. In the illustrated example, Internet activity is collected based on unique user IDs 104a-c for each of the panelist members 102a-c, and product purchasing information is collected using product purchase logs 106a-c.

Panelist computers 110a-c track and send information to an online web activity collector server 112 to monitor internet activity and websites visited by the panelist members 102a-c. Such monitoring can be performed using any known technique. Some example internet-activity monitoring techniques involve installing computer meters at panelist computers (e.g., the panelist computers 110a-c) that monitor user computer activity and store such indications of activities in log files that are subsequently communicated to a collection server. Such example computer metering techniques are disclosed in U.S. Pat. No. 5,675,510, to Coffey et al., and which is hereby incorporated by reference herein in its entirety. Other example internet-activity monitoring techniques involve collecting cookies to assess internet activities and interests (e.g., visited websites) of users. Such example internet-activity monitoring techniques are disclosed in U.S. Pat. No. 6,460,079, to Blumenau, and which is hereby incorporated by reference herein in its entirety. Yet other example internet-activity monitoring techniques involve monitoring content (e.g., advertisements, video, images, audio, etc.) displayed or presented at a computer using monitoring instructions embedded in the presented content. Such example internet-activity monitoring techniques are disclosed in U.S. Pat. No. 6,108,637, to Blumenau, and which is hereby incorporated by reference herein in its entirety.

In some examples, visited website information can be indicative of topical interests (e.g., automotive, sports, finance, baby care, health, fitness, fashion, dating, night life, etc.) of the panelist members 102a-c. The online web activity collector server 112 can be operated by an internet service provider (ISP), a website host, an Internet company, a media monitoring company such as The Nielsen Company, and/or a third-party contracted to perform such data collection.

The product purchase logs 106a-c are collected at a purchase activity collector server 114. The data in the product purchase logs 106a-c can be obtained using, for example, the Nielsen Homescan® purchase data collection service for the express purpose of market research and/or from any other purchase data collection techniques (e.g., from transaction log(tlog) data from retailers' loyalty card programs, from credit card company data, etc.). The product purchase logs 106a-c can be indicative of purchases made at retail stores, through websites, through mail-order, through phone-order, and/or through any other manner.

In the illustrated example, a model generator 116 receives purchase activity information 118 from the purchase activity collector 114 and web activity information 120 from the online web activity collector 112. The purchase activity information 118 includes records that associate product/service purchases with panelist IDs.

The web activity information 120 includes records that associate topical interests, age, gender, and geocode (e.g., postal code, region identifier, etc.) with respective panelist IDs. In the illustrated example, local index values 122 are obtained from a geographic-demographic consumption index database 124 storing consumption index values for different products for respective geographic locations (e.g., geo-cells shown in FIG. 2). The local index values 122 enable increasing the relevancy of targeted advertisements to consumers based on product/service affinities indicated by the index values 122 for respective local geographic regions of the consumers. For example, an index value for a particular product in a particular region and analyzed in the context of a particular demographic profile or demographic group may indicate that consumers of that demographic profile never or rarely purchase such a product in that region. Thus, an advertisement for that product would have relatively low relevancy to consumers of that demographic profile in that region. Thus, even when an advertisement for a particular product may seem relevant for a particular person based on that person's Internet web activities, the advertisement may not be relevant when analyzed in the context of the demographic-geographic based consumption index associated with that person. Reasons for low consumption index values 122 may be overall product preferences (e.g., local brands are preferred) in a particular region, a particular product (e.g., a particular type of product/service, a particular brand) may not be available within a region, a product may be of little use in a region (e.g., winter clothing in tropical climate areas), etc. The geographic-demographic consumption index database 124 is described in detail below in connection with FIG. 2.

In the illustrated example, the model generator 116 generates a consumer affinity model 126 based on the purchase activity information 118, the web activity information 120, and the local index values 122 using, for example, one or more regression techniques, a decision tree, business rules, neural networks, and/or any other suitable modeling technique. The consumer affinity model 126 can be used to identify consumer affinities for different products/services based on the web activity habits, geographic locations, and demographics of those consumers.

The consumer affinity model 126 can subsequently be used by, for example, an ISP, an Internet company, a website host, etc. to target advertisements to non-panelist user(s) 128 based on online web interests 130 and demographic/location profiles 132 of the non-panelist user(s) 128. In the illustrated example, the online web interests 130 can be collected via, for example, tracking cookies, internet addresses, proxy servers, registrations, and/or any other suitable online web activity collection technique. The demographic/location profiles 132 can include gender information, age information, household income information, geographic location information, and can be collected via, for example, subscriber account information, survey information, or any other suitable technique or information based on activity (e.g., websites visited, purchases, behavior, etc.). In some examples, subscriber accounts may be for social network websites or any other online services providing user-registration opportunities. In some examples, the geographic location information of non-panelist users can be collected using IP address-to-postal code detection techniques that map IP addresses to postal codes.

To target advertisements in the example of FIG. 1, the online web interests 130 and demographic/location profiles 132 are provided as inputs to the consumer affinity model 126. The consumer affinity model 126 processes these inputs to identify consumer affinity values 134 for one or more products/services that the model correlates to the online web interests 130. In the illustrated example, an advertisement selector 136 uses the product affinities 134 to select one or more targeted advertisements 138 from an advertisement database 144 for presenting in an ad display 140 at a consumer computer 142. In the illustrated example, the ad display 140 may be presented on a web page being actively browsed on the consumer computer 142 or may be presented on a pop-up web page (e.g., a secondary web page) spawned external to or in addition to the actively browsed web page.

Figure 2:
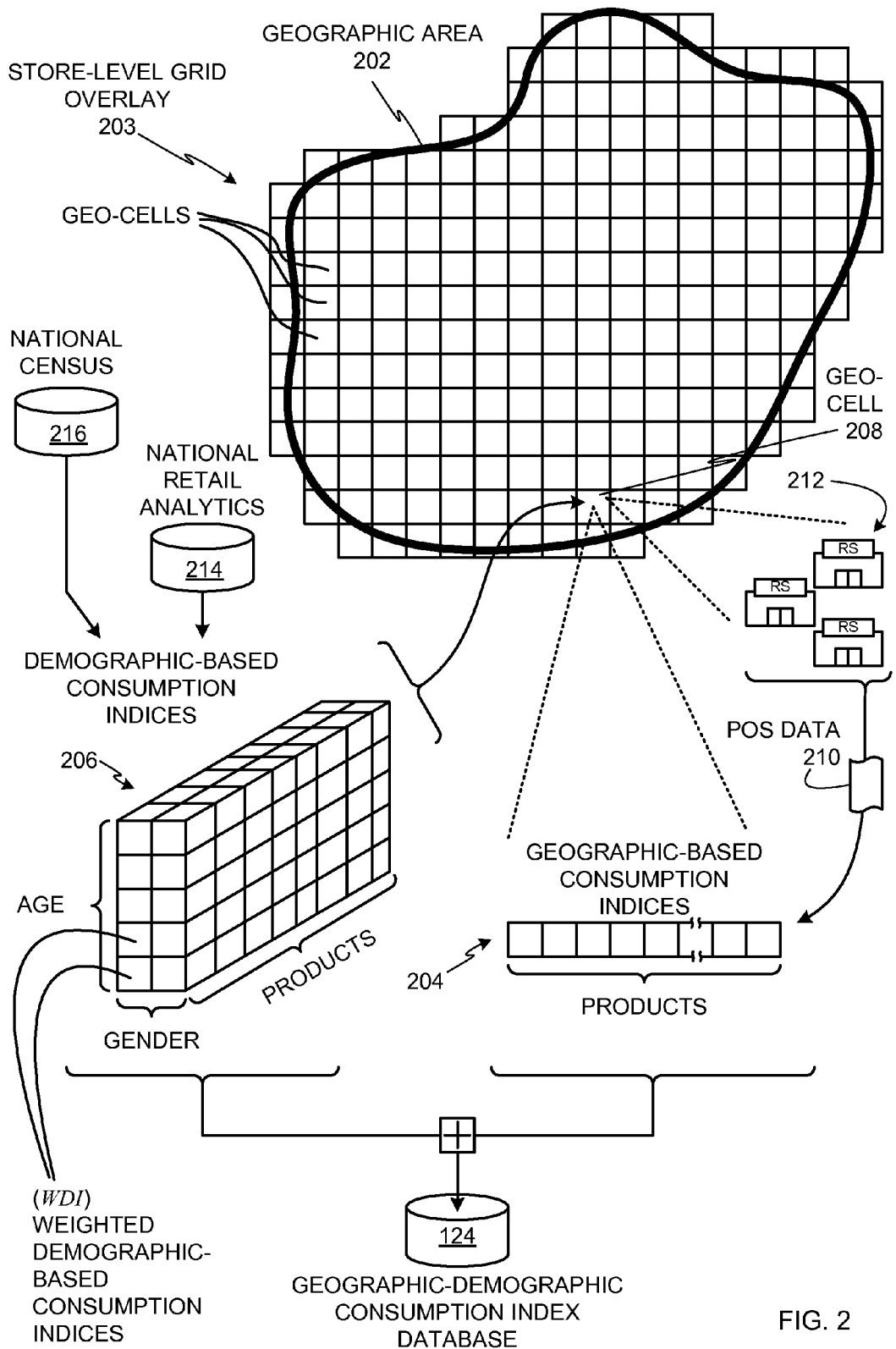
FIG. 2 depicts an example process for generating a geographic-demographic consumption indices grid.

FIG. 2 depicts an example process for generating the geographic-demographic consumption indices database 124 of FIG. 1. In illustrated examples disclosed herein, consumption index values from the geographic-demographic consumption indices database 124 can be used to supply the local index values 122 of FIG. 1 to increase the relevancy of targeted advertisements to consumers based on the product consumption indices related to the demographics and geographic locations of those consumers. For example, a local index value in the geographic-demographic consumption indices database 124 for a particular product in a particular region (e.g., a geo-cell 208) and analyzed in the context of a particular demographic profile may indicate that consumers of that demographic profile never or rarely purchase such a product in that region and, thus, an advertisement for that product would have relatively low relevancy to consumers of that demographic profile in that region. Thus, even when an advertisement for a particular product may seem relevant for a particular person based on that person's Internet web activities (or any other activities such as television viewership, radio listenership, print media readership etc.), the advertisement may not be relevant when analyzed in the context of the demographic-geographic based consumption index associated with that person.

In the illustrated example, a geographic area 202 is shown overlaid with a store-level grid overlay 203 having a plurality of geo-cells, one of which is shown at reference numeral 208. The geographic area 202 can be, for example, a territory, a state, a country, a zip-code-bounded area (e.g., a municipality, a county, or a portion thereof), or any other geographic area. In some examples, using a smaller area for the geographic area 202, while keeping the quantity of geo-cells the same would result in more relevant and actionable geo-cell information. This is because each geo-cell would cover less people and, thus, less variety in consumer characteristics such that the indices of those geo-cells would be more specific or accurate relative to those fewer people.

Each of the geo-cells of the store-level grid overlay 203 may be identified by a location identifier or geocode (e.g., a census tract, a block group, a zip code, a postal code, a county, a state, a territory, etc.) that identifies a sub-area smaller than the geographic area 202. In the illustrated example, the geographic area 202 is a zip-code (or postal code) bounded area and each of the geo-cells is a smaller local area (e.g., a census tract or a zip+4 code) and represents a store-level area (e.g., an area in which one or more stores are identified as predominantly serving persons living within the same local area and/or identified neighboring areas, such as neighboring geo-cells). In the illustrated example, a geographic-based consumption indices grid 204 is generated for a geo-cell 208 using aggregated retail-level point of sale (POS) data 210 for different products sold at retail stores 212 in the geo-cell 208. Similar geographic-based consumption indices grids can be generated for other geo-cells using the techniques disclosed herein.

Different products can be referenced by category (e.g., salty snacks), brand (e.g., Frito Lay® snacks), sub-brand (e.g., Doritos® tortilla chips), product type (e.g., cheese-flavored tortilla chips), etc. Each value for each product represented in the geographic-based consumption indices grid 204 is an index of consumption (e.g., a general consumption index (GCI)). Each GCI can be related to category, product-type, brand, or sub-brand product consumption. In the illustrated example, the GCI (e.g., a geographic area consumption index (GAI) of Equation 3 below) for a particular product in the geo-cell 208 is computed by determining the per-person local average sales volume ($V_{PL(avg)}$) at a certain product level (e.g., category, brand, sub-brand, product type, etc.) based on the POS data 210 from the retail stores 212 in the corresponding geo-cell 208, dividing the resulting per-person local average sales volume ($V_{PL(avg)}$) 1 by a per-person national average sales volume ($V_{PN(avg)}$) at the same product level (e.g., category, brand, sub-brand, product type, etc.), and then multiplying the quotient result by 100, as shown in Equation 3 below. In the illustrated example, the per-person national average sales volume ($V_{PN(avg)}$) for different products may be obtained from a national retail analytics database 214 that stores per-person national sales volume averages for different products and also stores national consumption information (e.g., volumetric sales data, national consumption indices, etc.) for different products by demographic segment and by general population. The national retail analytics database 214 of the illustrated example is implemented by the Spectra™ database, which is generated and maintained by The Nielsen Company. In some examples, additional and/or alternative data sources can be used to account for undercoverage of the raw retail store data (e.g., the POS data 210) for each geo-cell or to fill in any missing data points.

Also shown in FIG. 2 is a demographic-based consumption indices grid 206 corresponding to the geo-cell 208. Similar demographic-based consumption indices grids can be generated for other geo-cells using the techniques disclosed herein. The demographic-based consumption indices grid 206 is generated by compiling individual-level purchase data (e.g., the product purchase logs 106*a-c* of FIG. 1 of individual consumers) to create a demographic grid (e.g., age/gender groups or groups made up of any other demographic information, such as, household income, quantity of household members, etc.). Each cell of the demographic-based consumption indices grid 206 is referenced by a specific combination of demographic factors (e.g., female, age 20-30, etc.).

In the illustrated example, each cell value in the demographic-based consumption indices grid 206 is a weighted demographic consumption index (WDI) (e.g., a local demographic-based consumption index for a particular geo-cell such as the geo-cell 208). A weighted demographic consumption index (WDI) is based on a geographic area consumption index (GAI), a raw demographic consumption index (DI), and demographic proportion weighting values (W).

In the illustrated example, the weighted demographic consumption index (WDI) for a particular demographic group of the geo-cell 208 represented in the demographic-based consumption indices grid 206 is determined using example Equation 1 below.

$$WDI_n = DI_n + GAAT \qquad \text{Equation 1}$$

In Equation 1 above, the weighted demographic consumption index (WDI) for a particular demographic group or segment is determined by adding a raw demographic consumption index (DI) corresponding to the particular demographic group or segment with a geographic area adjustment total (GAAT). Equation 1 above can be used to determine weighted demographic consumption indices ($WDI_n$) for the same demographic group or segment in all (N) geo-cells in the geographic area 202.

For use in example Equation 1, the raw demographic consumption indices ($DI_n$) for sales volume of a particular product by a particular demographic group or segment in the different geo-cells of FIG. 2 can be obtained from one or more of the product purchase logs 106*a-c* of FIG. 1 of individual consumers of the geographic area 202.

In the illustrated example of FIG. 2, a geographic area adjustment total (GAAT) is used to correlate sales volumes of product(s) or product type(s) with demographic group(s) or segment(s) attributable to those sales volumes. The geographic area adjustment total (GAAT) for the geographic area 202 is used to weight raw demographic consumption indice(s) (DI) corresponding to different demographic group(s) or segment(s) in the geo-cell 208 to determine corresponding weighted demographic consumption indice(s) (WDI) for those demographic group(s) or segment(s). Example Equation 2 below may be used to determine a geographic area adjustment total (GAAT).

$$GAAT = GAI - \sum_{1}^{N}(W_n * DI_n) \qquad \text{Equation 2}$$

In Equation 2 above, each demographic proportion weighting value ($W_n$) represents the proportion of the population in a respective geo-cell (e.g., the geo-cell 208 of FIG. 2) that falls within the particular demographic group corresponding to the geographic area adjustment total (GAAT). In the illustrated example, the geographic area adjustment total (GAAT) for the geographic area 202 is determined based on demographic proportion weighting values ($W_n$) and raw demographic consumption indices ($DI_n$) for all (N) geo-cells (i.e., n=1, 2, ..., N-1, N).

As shown in Equation 2 above, the sum of the products of demographic proportion weighting values ($W_n$) and raw demographic consumption indices ($DI_n$) for all (N) geo-cells (i.e., $$\left(\sum_{1}^{N}(W_n * DI_n)\right)$$

is subtracted from a geographic area consumption index (GAI) (determined using Equation 3 below) to determine the geographic area adjustment total (GAAT).

Referring specifically to the geo-cell 208, its demographic proportion weighting value ($W_n$) for a particular demographic group or segment enables weighting a corresponding raw demographic consumption index ($DI_n$) for the same demographic group in the geo-cell 208 by a percentage representative of the quantity of consumers in the geo-cell 208 that fall into that demographic group. For example, for a weighted demographic consumption index (WDI) in the demographic-based consumption indices grid 206 corresponding to females, age 20-30 (e.g., a demographic group having a corresponding demographic proportion weighting value ($W_n$) and raw demographic consumption index ($DI_n$)), census data from a national census database 216 is used to quantify the percentage of consumers (e.g., the corresponding demographic proportion weighting value ($W_n$)) in the geo-cell 208 that fall into the female, age 20-30 demographic group. That percentage (represented by the demographic proportion weighting value ($W_n$)) is then used to weight the raw demographic consumption index ($DI_n$) corresponding to the female, age 20-30 demographic group as shown in Equation 2 to arrive at a demographic-based consumption index (e.g., the weighted demographic consumption index (WDI)) for a particular product at the geographic location corresponding to the geo-cell 208. In the illustrated example, the national census database 216 is implemented using a government census database (e.g., the United States national census database compiled and maintained by the U.S. Census Bureau).

A geographic area consumption index (GAI) represents a consumption index for a particular product among the general population of the entire geographic area 202 or any other geographic area encompassing multiple smaller cells such as the geo-cells of FIG. 2. In some examples, a geographic area consumption index (GAI) can be determined using Equation 3 below.

$$GAI = \frac{V_{PL(avg)}}{V_{PN(avg)}} * 100 \qquad \text{Equation 3}$$

As shown in Equation 3 above, a geographic area consumption index (GAI) for the geographic area 202 is determined by dividing a per-person local average buying volume (or per-person local average sales volume) ($V_{PL(avg)}$) at a certain product level (e.g., category, brand, sub-brand, product type, etc.) for the general population of the geographic area 202 by a per-person national average buying volume (or per-person national average sales volumes) ($V_{PN(avg)}$) at the same product level (e.g., category, brand, sub-brand, product type, etc.). In the illustrated example, the per-person local average buying volume ($V_{VL(avg)}$) and the per-person national average buying volume ($V_{PN(avg)}$) are independent of demographic segmentation and, thus, are indicative of average buying volumes (or average sales volumes) for the general population. The resulting quotient $$\left(\frac{V_{PL(avg)}}{V_{PN(avg)}}\right)$$

is multiplied by 100 as shown above in Equation 3.

In some examples, the per-person local average buying volume ($V_{PL(avg)}$) of Equation 3 can be obtained from the POS data 210 of FIG. 2 and the per-person national average buying volume ($V_{PN(avg)}$) of Equation 3 can be obtained from the national retail analytics database 214. In an example use of Equation 3 above, if the per-person local average buying volume ($V_{PL(avg)}$) is $10.00 for a given product in the geographic area 202 and the per-person national average buying volume ($V_{PN(avg)}$) for the same product is $5.00, the local consumer population of the geographic area 202 over-indexes the national average by 100% and carries or exhibits a consumption index of 200.

Example techniques disclosed herein can use weighted demographic consumption indices ($WDI_n$) to determine consumer affinity levels for different products based on whether local sales volumes of products over-index or under-index relative to national sales volumes. For example, if a local demographic group of females, age 20-30 (e.g., a demographic group or segment represented in the geographic-based consumption indices grid 206) in the geo-cell 208 consume or purchase, on average, $5.00 of a given product and the national average for the same product is $10.00, that demographic group under-indexes the national average by 100% and carries or exhibits a consumption index of 50.

Figure 9:
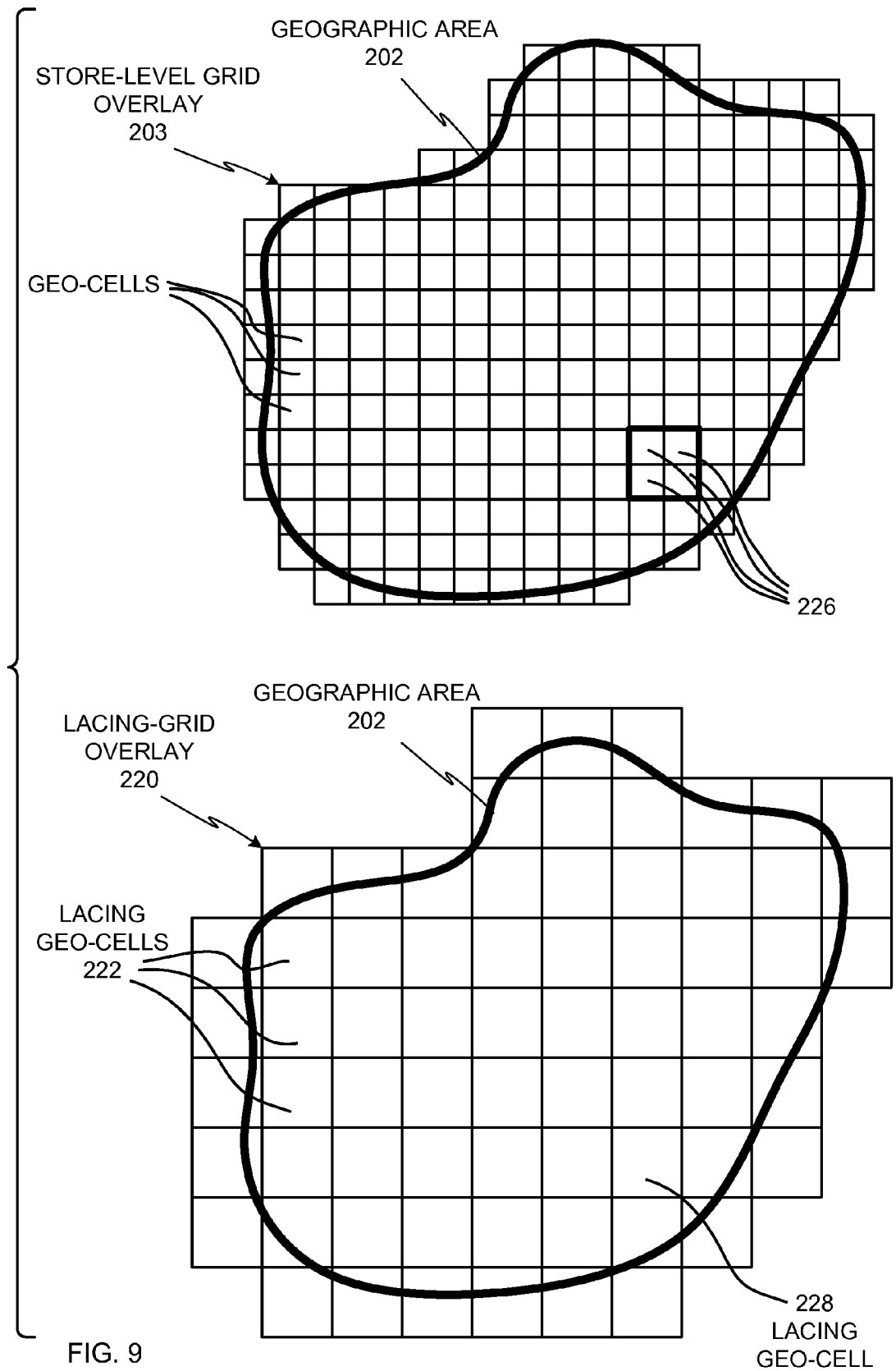
FIG. 9 shows a store-level grid overlay and a lacing-grid overlay relative to a geographic area of FIG. 2.

In some examples, to better align the disaggregated individual information from the demographic-based consumption indices grid 206 and the aggregated store information from the geographic-based consumption indices grid 204, a lacing process and adjustments can be performed. Such lacing and adjustments are implemented in some examples by creating another grid at the same or higher-geographic level as the geographic levels of the store-level grid overlay 203 overlaid onto the geographic area 202, but at the same product level (e.g., category, brand, sub-brand, product type). An example higher-geographic level grid is shown in FIG. 9 as a lacing-grid overlay 220 having lacing geo-cells 222 that are larger relative to the geo-cells of the store-level grid overlay 203. Each lacing geo-cell 222 of the lacing-grid overlay 220 (which is overlaid onto the geographic area 202 in the illustrated example of FIG. 9) is populated with consumption indices based on product purchase information (e.g., the product purchase logs 106a-c) from individuals in the larger lacing geo-cells 222. These consumption indices are computed by determining the per-person average buying at a certain level (e.g., category, brand, sub-brand, product type, etc.) in the respective lacing geo-cells 222, dividing the resulting per-person average buying by the per-person average national buying at the same product level (e.g., category, brand, sub-brand, product type, etc.), and multiplying the resulting quotient by 100. Once the lacing geo-cells 222 of the lacing-grid overlay 220 are populated with such data, the groups of neighboring smaller geo-cells of the original store-level grid overlay 203 (also shown as overlaid onto the geographic area 202 in FIGS. 2 and 9) can be aligned with corresponding ones of the relatively larger lacing geo-cells 222 of the enlarged-cell grid overlay 220 to supplant or modify the consumption indices of the individual product purchase information (e.g., the product purchase logs 106a-c) in the relatively smaller geo-cells of the store-level grid overlay 203 based on corresponding consumption indices of the lacing geo-cells 222 of the lacing-grid overlay 220. Such modification of the consumption indices in the store-level grid overlay 203 may be performed using matrix multiplication operations or any other matrix operation based on the consumption indices of smaller geo-cells in the store-level grid overlay 203 and consumption indices of the lacing geo-cells in the lacing-grid overlay 220.

If the lacing overlay grid (e.g., the lacing-grid overlay 220) is at a higher geographical level (e.g., a metro area) and the original store-level grid (e.g., the store-level grid overlay 203) is at a lower geographical level (e.g., zip code), then the resulting alignment between the two grids 203 and 220 generates groups of neighboring geo-cells in the store-level grid overlay 203 having the consumption indices equal to corresponding larger lacing geo-cells 222 of the enlarged-cell grid overlay 220 for corresponding geographies. For example, FIG. 9 shows a group of neighboring smaller geo-cells 226 of the store-level grid overlay 203 that correspond to a lacing geo-cell 228. In the illustrated example, the consumption indices of the smaller geo-cells 226 are supplanted or modified based on the consumption index of the corresponding lacing geo-cell 228 so that any inaccurate or missing consumption index information of any one or more of the smaller geo-cells 226 can be adjusted based on the consumption index of the lacing geo-cell 228.

In addition, the aggregated store information from the geographic-based consumption indices grid 204 can be adjusted to compensate or introduce correction factors for geo-cells having unusually high concentrations of product sales activities due to large-volume stores located therein. Such large-volume stores are often referred to as big-box stores or discount department stores and are typically separated by longer distances from one another than other retail stores such as grocery stores or other local stores. These stores often draw consumers from relatively long distances (including neighboring geo-cells) due to their low prices and product variety. Such wide-spread consumer draw across multiple geo-cells can result in a higher concentration of product sales activities in the geo-cells having the large-volume stores and diminish the sales activities reflected in neighboring geo-cells. To compensate or introduce correction factors in such instances, the consumption indices in each geo-cell subject to the effects of large-volume stores can be adjusted to increase the accuracy of sales attributed to persons residing in those geo-cells (even if those persons travelled to neighboring geo-cells due to the large-volume stores). For example, such an adjustment can be performed by subtracting the sales that are due to shoppers that live in other areas (e.g., neighboring geo-cells) from a geo-cell having a large-volume store. The subtracted sales can then be added to the sales of respective geo-cells (e.g., the geo-cells neighboring the geo-cell having the large-volume store) in which reside the shoppers to which those sales are attributed.

Performing the above-described adjustment increases the accuracy of attributing sales to the geo-cells in which shoppers associated with those sales reside. In addition, the consumption index for a particular product in each geo-cell can be weighted by adding to the consumption index a corresponding share or proportion of a national all commodity volume (ACV) sold in the geographic area 202. Performing such an adjustment substantially reduces or eliminates the effects of instances in which a few small stores (in respective geo-cells) exhibiting a relatively high purchasing volume (e.g., of a particular brand, sub-brand or category of interest) drive the consumption index of their respective geo-cells artificially higher due to a portion of those sales being misattributed to consumers residing in the geo-cells containing those stores rather than to consumers of surrounding geo-cells that travelled to those stores.

In the illustrated example of FIG. 2, the geographic-based consumption indices grid 204 (adjusted through lacing or not) and the demographic-based consumption indices grid 206 are combined to generate the indices stored in the geographic-demographic consumption index database 124. For example, the indices in the grids 204 and 206 may be combined using a matrix multiplication operation or any other matrix operation to determine the geographic-demographic consumption indices of the geographic-demographic consumption index database 124. The new geographic-demographic consumption index database 124 will have as many cells as the multiplication of the cells of the grids 204 and 206 (e.g., if the geographic-based consumption indices grid 204 has 45,000 cells and the demographic-based consumption indices grid 206 has 20 cells, the resulting grid represented in the geographic-demographic consumption index database 124 will include 900,000 cells). Each cell represented in the geographic-demographic consumption index database 124 combines the information from the respective cells of the original grids 204 and 206. The resulting information in each cell of the geographic-demographic consumption index database 124 enables accounting for how much over/under indexing in terms of purchasing is characteristic for regions and demographics specific to each cell compared to the national average on a per-person basis. Such geographically and demographically adjusted consumption indices can be used advantageously in the example process depicted in FIG. 1 to make targeted advertisements for products/services more relevant (and effective) to individual consumers. In some examples, the indices in the geographic-demographic consumption index database 124 can be used without the modeling depicted in FIG. 1 to target advertisements. In such examples, index values can be looked-up in the geographic-demographic consumption index database 124 based on geographic and demographic information (e.g., without the web activity and topical interest information discussed above in connection with FIG. 1) of consumers to identify consumers for which particular advertisements would be more relevant and effective.

Figure 3:
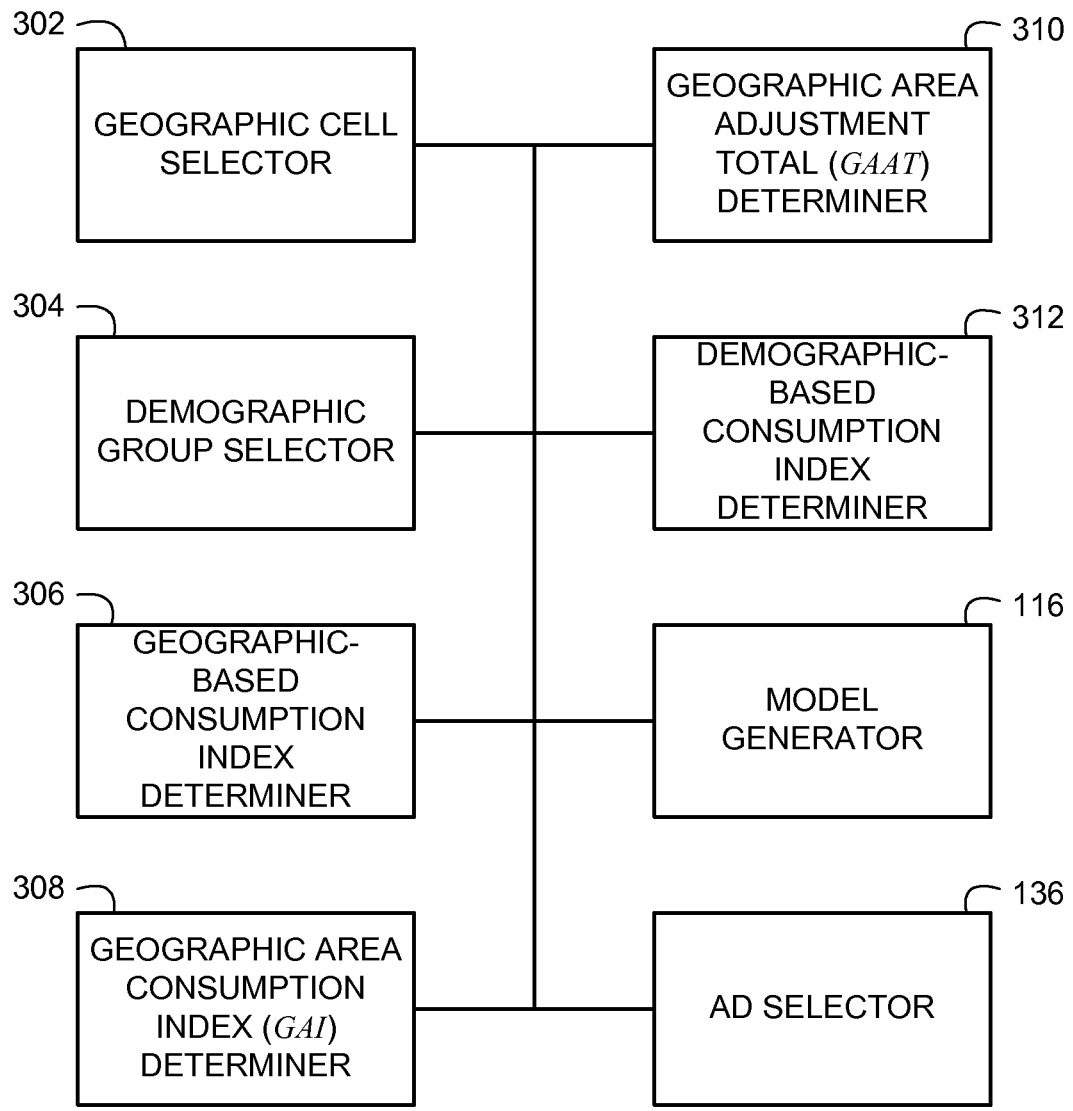
FIG. 3 is an example apparatus that may be used to determine product consumption indices, consumer affinity models, and target advertising based on such indices and models.

FIG. 3 is an example apparatus 300 that may be used to determine product consumption indices, consumer affinity models, and/or target advertising based on such indices and models. For example, the apparatus 300 may be used to determine geographic-based consumption indices of the geographic-based consumption indices grid 204 of FIG. 2, demographic-based consumption indices of the demographic-based consumption indices grid 206 of FIG. 2, geographic-demographic consumption indices of the geographic-demographic consumption index database 124 of FIGS. 1 and 2, and/or affinity models such as the affinity model 126 of FIG. 1.

In the illustrated example, the apparatus 300 includes a geographic cell selector 302, a demographic group selector 304, a geographic-based consumption index determiner 306, a geographic area consumption index (GAI) determiner 308, a geographic area adjustment total (GAAT) determiner 310, a demographic-based consumption index determiner 312, the model generator 116 of FIG. 1, and the ad selector 136 of FIG. 1. The geographic cell selector 302, the demographic group selector 304, the geographic-based consumption index determiner 306, the geographic area consumption index (GAI) determiner 308, the geographic area adjustment total (GAAT) determiner 310, the demographic-based consumption index determiner 312, the model generator 116, and/or the ad selector 136 may be implemented using any desired combination of hardware, firmware, and/or software. For example, one or more integrated circuits, discrete semiconductor components, and/or passive electronic components may be used. Thus, for example, geographic cell selector 302, the demographic group selector 304, the geographic-based consumption index determiner 306, the geographic area consumption index (GAI) determiner 308, the geographic area adjustment total (GAAT) determiner 310, the demographic-based consumption index determiner 312, the model generator 116, and/or the ad selector 136, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The geographic cell selector 302, the demographic group selector 304, the geographic-based consumption index determiner 306, the geographic area consumption index (GAI) determiner 308, the geographic area adjustment total (GAAT) determiner 310, the demographic-based consumption index determiner 312, the model generator 116, and/or the ad selector 136, or parts thereof, may be implemented using instructions, code, and/or other software and/or firmware, etc. stored on a machine accessible medium or computer readable medium (e.g., the memory 824, 825, 827 of FIG. 8) and executable by, for example, a processor (e.g., the example processor 812 of FIG. 8). When any of the appended claims are read to cover a purely software implementation, at least one of the geographic cell selector 302, the demographic group selector 304, the geographic-based consumption index determiner 306, the geographic area consumption index (GAI) determiner 308, the geographic area adjustment total (GAAT) determiner 310, the demographic-based consumption index determiner 312, the model generator 116, or the ad selector 136 is hereby expressly defined to include a tangible medium such as a solid state memory, a magnetic memory, a digital versatile disc (DVD), a compact disc (CD), a blu-ray disc, etc.

Turning in detail to FIG. 3, the apparatus 300 of the illustrated example is provided with the geographic cell selector 302 to select one or more geo-cells (e.g., the geo-cell 208) of the geographic area 202 of FIG. 2. For example, the geographic cell selector 302 may be used to select geo-cells when generating geographic-based consumption indices for the geographic-based consumption indices grid 204 of FIG. 2, when generating demographic-based consumption indices for the demographic-based consumption indices grid 206 of FIG. 2, and/or when targeting advertisements to online users located in different geo-cells.

To select demographic groups or segments, the apparatus of the illustrated example is provided with the demographic group selector 304. For example, the demographic group selector 304 may be used to select demographic groups represented in the demographic-based consumption indices grid 206 of FIG. 2 when generating demographic-based consumption indices therefore and/or when targeting advertisements to online users having particular demographics.

To determine geographic-based consumption indices for the geographic-based consumption indices grid 204 of FIG. 2, the apparatus 300 is provided with the geographic-based consumption index determiner 306.

To determine geographic area consumption indices (GAI), the apparatus is provided with the geographic area consumption index (GAI) determiner 308. In the illustrated example, the geographic area consumption index (GAI) determiner 308 determines geographic area consumption indices (GAI) based on Equation 3 above.

To determine geographic area adjustment totals (GAAT), the apparatus is provided with the geographic area adjustment total (GAAT) determiner 310. In the illustrated example, the geographic area adjustment total (GAAT) determiner 310 determines geographic area adjustment totals (GAAT) based on Equation 2 above.

To determine demographic-based consumption indices, the apparatus is provided with the demographic-based consumption index determiner 312. In the illustrated example, the demographic-based consumption index determiner 312 determines demographic-based consumption indices for the demographic-based consumption indices grid 206 of FIG. 2 based on Equation 1 above.

FIGS. 4-7 are flow diagrams representative of example machine readable instructions that can be executed to implement the apparatus of FIG. 3. In some examples, one or more of the example processes of FIGS. 4-7 are implemented using machine readable instructions that, when executed, cause a device (e.g., the processor 812 of FIG. 8, a programmable controller or other programmable machine or integrated circuit) to perform the operations shown in FIGS. 4-7. For instance, the example processes of FIGS. 4-7 may be performed using a processor, a controller, and/or any other suitable processing device. For example, the example processes of FIGS. 4-7 may be implemented in coded instructions stored on a tangible machine readable medium such as a flash memory, a read-only memory (ROM), a digital versatile disc (DVD), a compact disc (CD), a blu-ray optical disc, and/or a random-access memory (RAM) associated with a processor or controller.

As used herein, the term tangible computer readable medium is expressly defined to include any type of computer readable storage and to exclude propagating signals. Additionally or alternatively, the example processes of FIGS. 4-7 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example processes of FIGS. 4-7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 4-7 may be implemented as any combination(s) of any of the foregoing techniques, for example, any combination of firmware, software, discrete logic, and/or hardware.

Although the example processes of FIGS. 4-7 are described with reference to the flow diagram of FIGS. 4-7, other methods of implementing the processes of FIGS. 4-7 may be employed. For example, the order of execution of the blocks may be changed, and/or some of the blocks described may be changed, eliminated, sub-divided, or combined. Additionally, one or both of the example processes of FIGS. 4-7 may be performed sequentially and/or in parallel by, for example, separate processing threads, processors, devices, discrete logic, circuits, etc.

Figure 4:
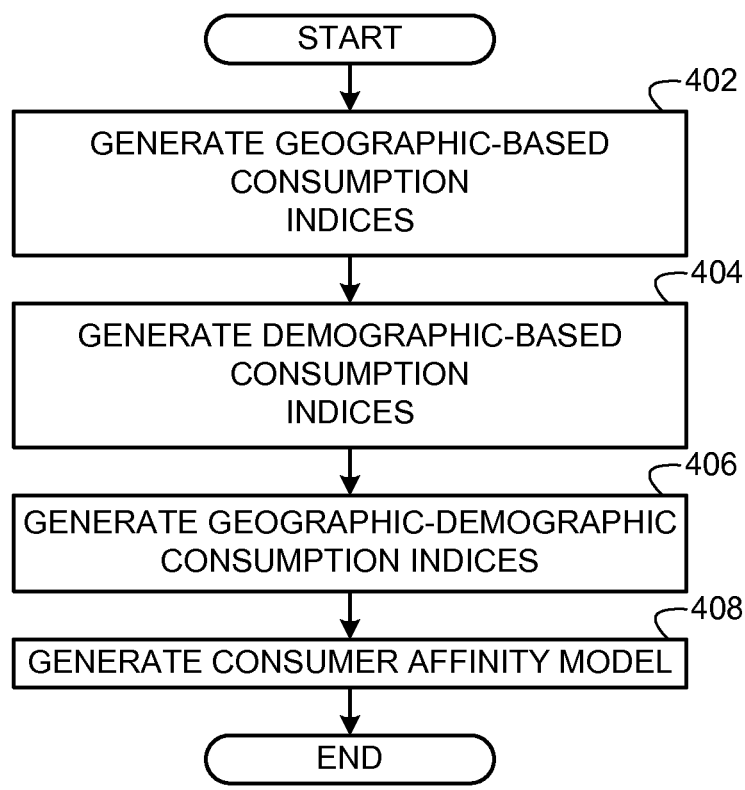
FIG. 4 is a flow diagram representative of example machine readable instructions that can be executed to perform the data fusion and modeling processes depicted in FIGS. 1 and 2.

FIG. 4 is a flow diagram representative of example machine readable instructions that can be executed to perform the data fusion and modeling processes depicted in FIGS. 1 and 2. Initially, the geographic-based consumption index determiner 306 (FIG. 3) generates the geographic-based consumption indices grid 204 of FIG. 2 (block 402) as discussed above in connection with FIG. 2. An example process that may be used to generate the geographic-based consumption indices grid 204 is described below in connection with the example process of FIG. 6.

The demographic-based consumption index determiner 312 generates the demographic-based consumption indices grid 206 of FIG. 2 (block 404) as discussed above in connection with FIG. 2. An example process that may be used to generate the demographic-based consumption indices grid 206 is described below in connection with the example process of FIG. 7.

The geographic-demographic consumption indices database 124 of FIGS. 1 and 2 is generated (block 406) as discussed above in connection with FIG. 2. The consumer affinity model 126 of FIG. 1 is then generated (block 408) as discussed above in connection with FIG. 1. In some examples, the operation of block 408 is omitted and the targeted advertising techniques are implemented using the geographic-demographic consumption indices database 124 without the use of the consumer affinity model 126. The example process of FIG. 4 is then ended.

Figure 5:
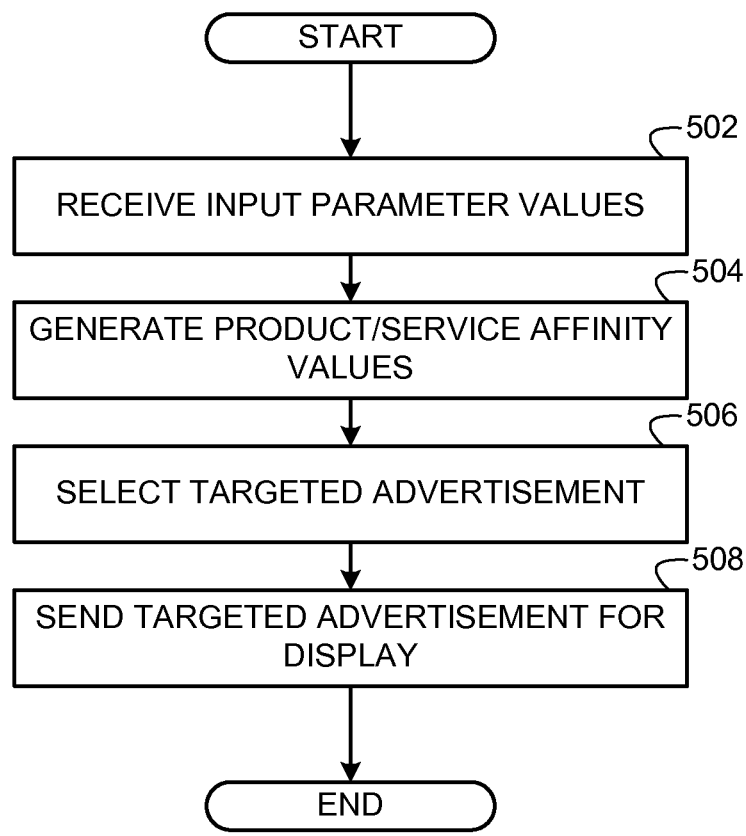
FIG. 5 is a flow diagram representative of example machine readable instructions that can be executed to identify targeted advertisements based on a consumer affinity model and/or consumption index values generated using the example process of FIG. 4.

FIG. 5 is a flow diagram representative of example machine readable instructions that can be executed to identify targeted advertisements (e.g., the targeted advertisement 138 of FIG. 1) based on the consumer affinity model 126 of FIG. 1 and/or the geographic-demographic consumption index database 124 of FIGS. 1 and 2. Initially, the affinity model 126 receives input parameter values (block 502). The input parameter values may be, for example, demographic information, location information, online web activity information (e.g., topical interests), product/service names, etc. The model 126 generates product/service affinity values (block 504). For example, the product/service affinity values (e.g., the one or more product affinities 134 of FIG. 1) may be generated based on the consumer affinity model 126 of FIG.

1 as discussed above in connection with FIG. 1. In some examples that do not use the affinity model 126, the product/service affinity values are generated based on the geographic-demographic consumption index database 124 (FIGS. 1 and 2) without using the consumer affinity model 126. For example, index values can be looked-up in the geographic-demographic consumption index database 124 based on geographic and demographic information (e.g., without the web activity and topical interest information discussed above in connection with FIG. 1) of consumers to identify consumers for which particular advertisements would be more relevant and effective.

The ad selector 136 selects a targeted advertisement (block 506). For example, as shown in FIG. 1, the advertisement selector 136 can select the targeted advertisement 138 from the advertisement database 144 based on the product affinities 134. In examples in which the consumer affinity model 126 is not used, the advertisement selector 136 can select the targeted advertisement 138 based on index values from the geographic-demographic consumption index database 124. For example, the advertisement selector 136 may be provided with a threshold value that must be met or exceeded by an index value in order to select a targeted advertisement associated with a product corresponding to that index value.

The targeted advertisement is then sent for display (block 508) at, for example, a consumer computer (e.g., the consumer computer 142 of FIG. 1). In the illustrated example, the target advertisement is selected at block 506 and sent for display at block 508 in real-time while a targeted user (e.g., the non-panelist user 128) is accessing or exposed to a web page containing the ad display 140. In the illustrated example, the ad display 140 may be presented on a web page being actively browsed on the consumer computer 142 or may be presented on a pop-up web page (e.g., a secondary web page) spawned external to or in addition to the actively browsed web page. The example process of FIG. 5 is then ended.

Figure 6:
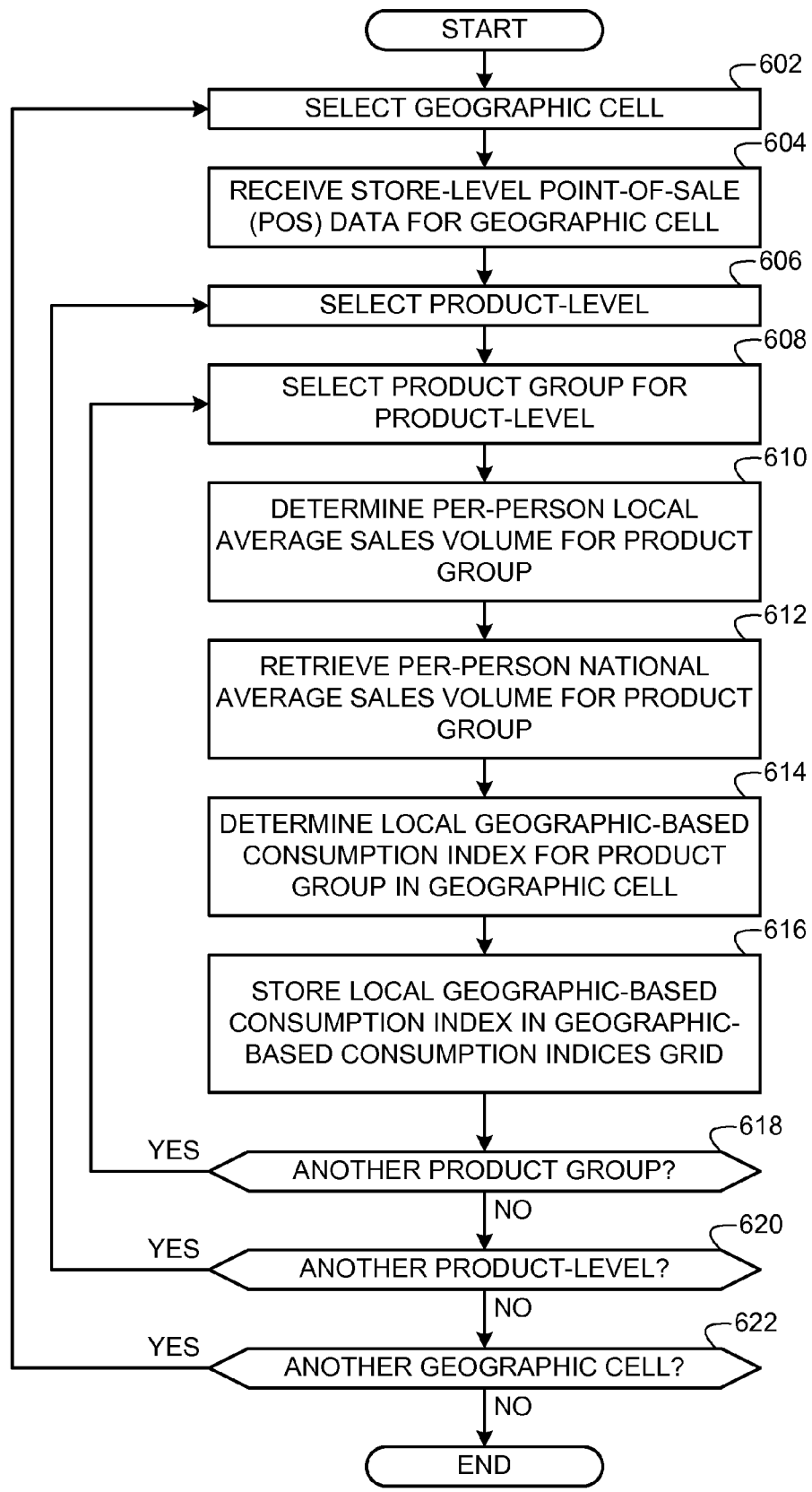
FIG. 6 is a flow diagram representative of example machine readable instructions that can be executed to determine geographic-based consumption indices.

FIG. 6 is a flow diagram representative of example machine readable instructions that can be executed to determine geographic-based consumption indices for the geographic-based consumption indices grid 204 of FIG. 2. Initially, the geographic cell selector 302 (FIG. 3) selects a geographic cell (block 602) such as one of the geo-cells of FIG. 2 (e.g., the geo-cell 208). The geographic-based consumption index determiner 306 (FIG. 3) receives the store-level POS data 210 (FIG. 2) for the selected geographic cell (block 604). The geographic-based consumption index determiner 306 selects a product-level (e.g., category, brand, sub-brand, product-type, etc.) (block 606) and selects a product group for the selected product-level (block 608). A product group may be, for example, salty snacks (category), Frito Lay® snacks (brand), Doritos® tortilla chips (sub-brand), cheese-flavored tortilla chips (product type), etc. The operations of blocks 606 and 608 may be based on user input or an automated process that selects product-levels and product groups from lists of product-levels and product groups. In some examples, product-level lists and product group lists may contain product-levels and product groups identified by one or more of a marketing research entity(ies), an advertiser(s), and/or any other entity(ies) associated with the implementation and/or use of techniques disclosed herein.

The geographic-based consumption index determiner 306 determines a per-person local average sales volume ($V_{PL\,(avg)}$) for the selected product group (block 610) by dividing the total sales volume of the product group obtained from the POS data 210 by the quantity of consumers in the selected geographic cell (e.g., the geo-cell 208).

The geographic-based consumption index determiner 306 retrieves a per-person national average sales volume ($V_{PN\,(avg)}$)(block 612) from, for example, the national retail analytics database 214 of FIG. 2. The geographic-based consumption index determiner 306 determines a local geographic-based consumption index for the selected product group in the selected geographic cell (block 614). In the illustrated example, the geographic-based consumption index determiner 306 can determine the local geographic-based consumption index (e.g., a geographic area consumption index (GAI)) using Equation 3 above. The geographic-based consumption index determiner 306 stores the local geographic-based consumption index in the geographic-based consumption indices grid 204 (block 616).

The geographic-based consumption index determiner 306 determines whether there is another product group for which to determine a local geographic-based consumption index (block 618). For example, product groups may be selected from a list of product groups or may be provided via user input. If there is another product group, control returns to block 608. Otherwise, the geographic-based consumption index determiner 306 determines whether there is another product-level for which to determine local geographic-based consumption indices (block 620). For example, product-levels may be selected from a list of product-levels or may be provided via user input. If there is another product-level, control returns to block 606. Otherwise, the geographic cell selector 302 determines whether there is another geographic cell (e.g., one of the geo-cells of FIG. 2) for which to determine local geographic-based consumption indices (block 622). If there is another geographic cell, control returns to block 602. Otherwise, the example process of FIG. 6 ends.

Figure 7:
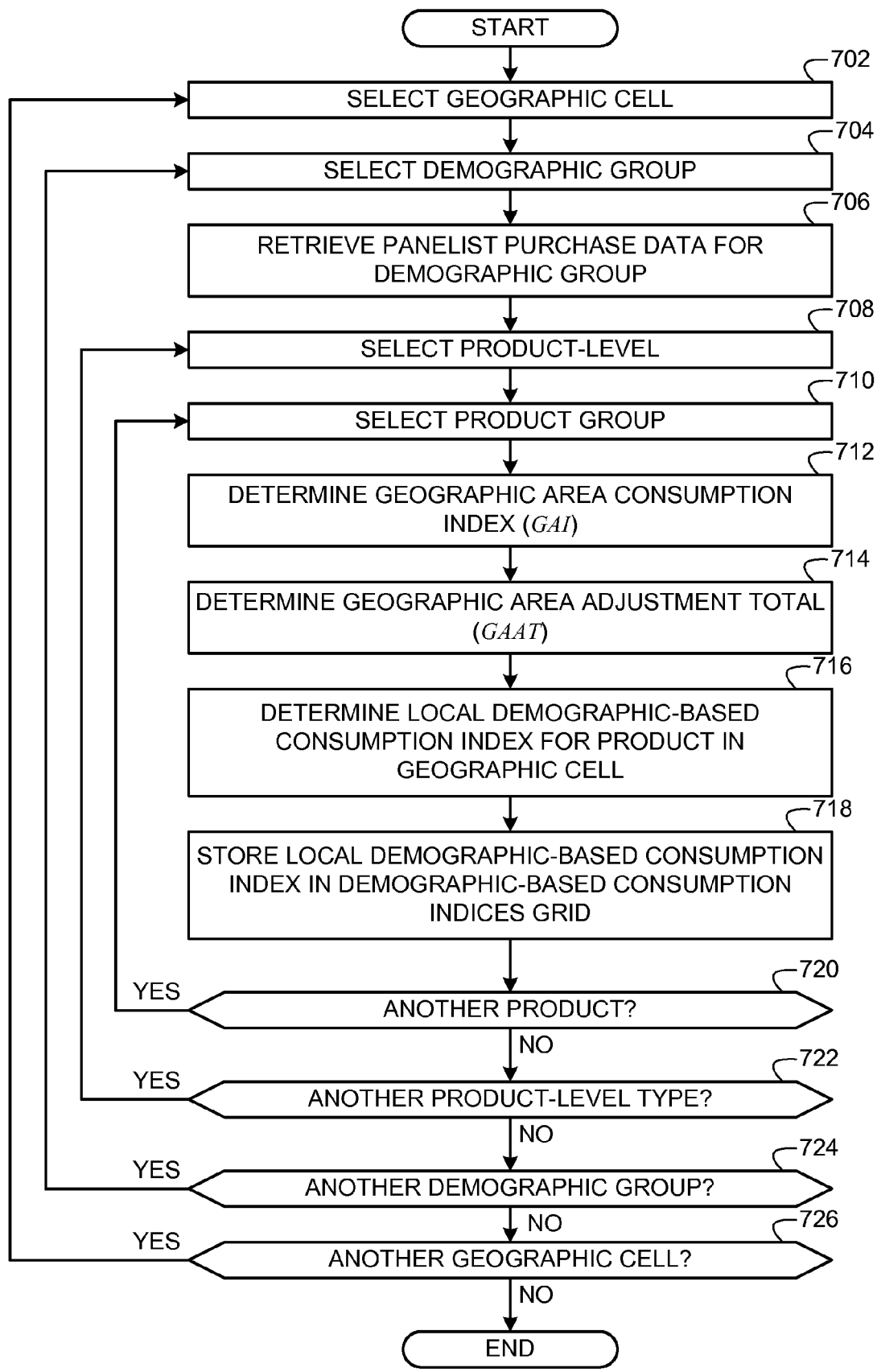
FIG. 7 is a flow diagram representative of example machine readable instructions that can be executed to determine demographic-based consumption indices.

FIG. 7 is a flow diagram representative of example machine readable instructions that can be executed to determine demographic-based consumption indices for the demographic-based consumption indices grid 206 of FIG. 2. Initially, the geographic cell selector 302 (FIG. 3) selects a geographic cell (block 702) such as one of the geo-cells of FIG. 2 (e.g., the geo-cell 208). The demographic group selector 304 (FIG. 3) selects a demographic group (block 704) corresponding to, for example, a demographic group represented in the demographic-based consumption indices grid 206 of FIG. 2. The demographic-based consumption index determiner 312 retrieves panelist purchase data for the selected demographic group (block 706). In the illustrated example, the panelist purchase data is obtained from the product purchase logs 106a-c of FIG. 1. The demographic-based consumption index determiner 312 selects a product-level (e.g., category, brand, sub-brand, product-type, etc.) (block 708) and selects a product group for the selected product-level (block 710). A product group may be, for example, salty snacks (category), Frito Lay® snacks (brand), Doritos® tortilla chips (sub-brand), cheese-flavored tortilla chips (product type), etc. The operations of blocks 708 and 710 may be based on user input or an automated process that selects product-levels and product groups from lists of product-levels and product groups. In some examples, product-level lists and product group lists may contain product-levels and product groups identified by one or more of a marketing research entity(ies), an advertiser(s), and/or any other entity(ies) associated with the implementation and/or use of techniques disclosed herein.

The geographic area consumption index (GAI) determiner 308 (FIG. 3) determines a geographic area consumption index (GAI) (block 712) as described above in connection with Equation 3. The geographic area adjustment total (GAAT) determiner 310 (FIG. 3) determines geographic area adjustment total (GAAT) (block 714) as described above in connection with Equation 2. The demographic-based consumption index determiner 312 determines a local demographic-based consumption index (e.g., demographic consumption index (WDI)) (block 716) as described above in connection with Equation 1. The demographic-based consumption index determiner 312 stores the local demographic-based consumption index in the demographic-based consumption indices grid 206.

The demographic-based consumption index determiner 312 determines whether there is another product group for which to determine a local demographic-based consumption index (block 720). For example, product groups may be selected from a list of product groups or may be provided via user input. If there is another product group, control returns to block 710. Otherwise, the demographic-based consumption index determiner 312 determines whether there is another product-level for which to determine local demographic-based consumption indices (block 722). For example, product-levels may be selected from a list of product-levels or may be provided via user input. If there is another product-level, control returns to block 708. Otherwise, the demographic group selector 304 determines whether there is another demographic group for which to determine local demographic-based consumption indices (block 724) for the currently selected geographic cell. If there is another demographic group in the currently selected geographic cell, control returns to block 704. Otherwise, the geographic cell selector 302 determines whether there is another geographic cell (e.g., one of the geo-cells of FIG. 2) for which to determine local demographic-based consumption indices (block 726). If there is another geographic cell, control returns to block 702. Otherwise, the example process of FIG. 7 ends.

Figure 8:
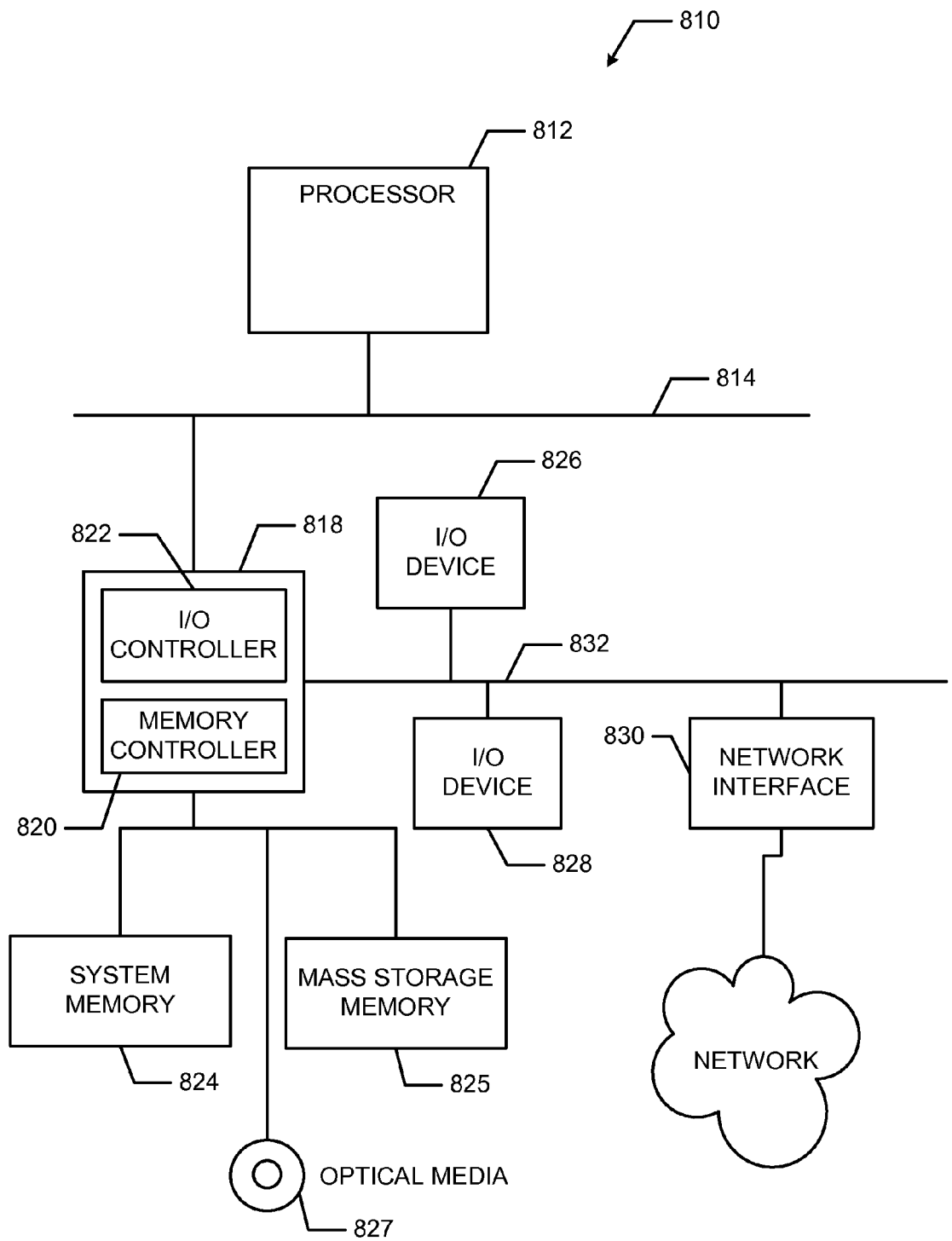
FIG. 8 is an example processor system that can be used to execute the example instructions of FIGS. 4, 5, 6 and/or 7 to implement the example apparatus of FIG. 3 and/or the example methods, apparatus, and/or articles of manufacture disclosed herein.

FIG. 8 is a block diagram of an example processor system 810 that may be used to implement the example apparatus, methods, and systems disclosed herein. As shown in FIG. 8, the processor system 810 includes a processor 812 that is coupled to an interconnection bus 814. The processor 812 may be any suitable processor, processing unit, or microprocessor. Although not shown in FIG. 8, the system 810 may be a multi-processor system and, thus, may include one or more additional processors that are identical or similar to the processor 812 and that are communicatively coupled to the interconnection bus 814.

The processor 812 of FIG. 8 is coupled to a chipset 818, which includes a memory controller 820 and an input/output (I/O) controller 822. A chipset provides I/O and memory management functions as well as a plurality of general purpose and/or special purpose registers, timers, etc. that are accessible or used by one or more processors coupled to the chipset 818. The memory controller 820 performs functions that enable the processor 812 (or processors if there are multiple processors) to access a system memory 824, a mass storage memory 825, and/or an optical media 827.

In general, the system memory 824 may include any desired type of volatile and/or non-volatile memory such as, for example, static random access memory (SRAM), dynamic random access memory (DRAM), flash memory, read-only memory (ROM), etc. The mass storage memory 825 may include any desired type of mass storage device including hard disk drives, optical drives, tape storage devices, etc. The optical media 827 may include any desired type of optical media such as a digital versatile disc (DVD), a compact disc (CD), or a blu-ray optical disc.

The I/O controller 822 performs functions that enable the processor 812 to communicate with peripheral input/output (I/O) devices 826 and 828 and a network interface 830 via an I/O bus 832. The I/O devices 826 and 828 may be any desired type of I/O device such as, for example, a keyboard, a video display or monitor, a mouse, etc. The network interface 830 may be, for example, an Ethernet device, an asynchronous transfer mode (ATM) device, an 802.11 device, a digital subscriber line (DSL) modem, a cable modem, a cellular modem, etc. that enables the processor system 810 to communicate with another processor system.

While the memory controller 820 and the I/O controller 822 are depicted in FIG. 8 as separate functional blocks within the chipset 818, the functions performed by these blocks may be integrated within a single semiconductor circuit or may be implemented using two or more separate integrated circuits.

Although the above discloses example methods, apparatus, systems, and articles of manufacture including, among other components, firmware and/or software executed on hardware, it should be noted that such methods, apparatus, systems, and articles of manufacture are merely illustrative and should not be considered as limiting. For example, it is contemplated that any or all of these hardware, firmware, and/or software components could be embodied exclusively in hardware, exclusively in firmware, exclusively in software, or in any combination of hardware, firmware, and/or software. Accordingly, while the above disclosed example methods, apparatus, systems, and articles of manufacture, the examples provided are not the only ways to implement such methods, apparatus, systems, and articles of manufacture.

Although certain methods, apparatus, systems, and articles of manufacture have been disclosed herein, the scope of coverage of this patent is not limited thereto. To the contrary, this patent covers all methods, apparatus, systems, and articles of manufacture fairly falling within the scope of the claims either literally or under the doctrine of equivalents.

What is claimed is:

1. A method, comprising:
   generating a geographic-based consumption index for a product in a first cell of a plurality of geographic cells of a larger geographic area based on dividing a first per-person local average sales volume of the product corresponding to the first cell by a second per-person average sales volume of the product corresponding to the larger geographic area;
   generating a demographic-based consumption index for the product based on a sales volume of the product for a demographic group in the first cell;
   generating a consumer affinity model via a hardware processor based on panel member information and non-panelist information, the panel member information indicative of panelist off-line purchases, panelist on-line activity, panelist geographic locations, and demographics of the panel members, the non-panelist information associated with the geographic-based consumption index and the demographic-based consumption index and generated independent of monitoring activities of the panel members; and
   using the consumer affinity model to select an advertisement to present on a computer of a person based on an online web interest, a geographic location, and a demographic of the person and further based on the geographic-based consumption index and the demographic-based consumption index.

2. A method as defined in claim 1, wherein the first per-person local average sales volume and the sales volume of the product for the demographic group in the first cell are based on volumetric sales for a retailer located in the first cell.

3. A method as defined in claim 1, further comprising generating a geographic-demographic consumption index for the product based on the geographic-based consumption index for the product and the demographic-based consumption index for the product.

4. A method as defined in claim 3, wherein selecting the advertisement based on the geographic-based consumption index and the demographic-based consumption index comprises selecting the advertisement for presentation to the person based on the geographic-demographic consumption index.

5. A method as defined in claim 1, wherein the panel members are members of a panel maintained and monitored by a market research entity for the express purpose of market research.

6. A method as defined in claim 1, wherein the person associated with the computer is not one of the panel members.

7. A method as defined in claim 1, wherein the advertisement is selected for presentation to the person in real-time while the person is accessing a web page, the advertisement to be presented via the web page or a second web page related to the web page.

8. An apparatus, comprising:
   a processor; and
   a memory having instructions stored thereon that, when executed, cause the processor to:
   generate a geographic-based consumption index for a product in a first cell of a plurality of geographic cells of a larger geographic area based on dividing a first per-person local average sales volume of the product corresponding to the first cell by a second per-person average sales volume of the product corresponding to the larger geographic area;
   generate a demographic-based consumption index for the product based on a sales volume of the product for a demographic group in the first cell;
   generate a consumer affinity model based on panel member information and non-panelist information, the panel member information indicative of panelist off-line purchases, panelist on-line activity, panelist geographic locations, and demographics of the panel members, the non-panelist information associated with the geographic-based consumption index and the demographic-based consumption index and generated independent of monitoring activities of the panel members; and
   use the consumer affinity model to select an advertisement to present on a computer of a person based on an online web interest, a geographic location, and a demographic of the person and further based on the geographic-based consumption index and the demographic-based consumption index.

9. An apparatus as defined in claim 8, wherein the first per-person local average sales volume and the sales volume of the product for the demographic group in the first cell are based on volumetric sales for a retailer located in the first cell.

10. An apparatus as defined in claim 8, wherein the instructions, when executed, cause the processor to generate a geographic-demographic consumption index for the product based on the geographic-based consumption index for the product and the demographic-based consumption index for the product.

11. An apparatus as defined in claim 10, wherein selecting the advertisement based on the geographic-based consumption index and the demographic-based consumption index comprises selecting the advertisement for presentation to the person based on the geographic-demographic consumption index.

12. An apparatus as defined in claim 8, wherein the panel members are members of a panel maintained and monitored by a market research entity for the express purpose of market research.

13. An apparatus as defined in claim 8, wherein the person associated with the computer is not one of the panel members.

14. An apparatus as defined in claim 8, wherein the instructions, when executed, cause the processor to select the advertisement in real-time while the person is accessing a web page, the advertisement to be presented via the web page or a second web page related to the web page.

15. A tangible machine readable storage medium comprising instructions that, when executed, cause a machine to at least:
   generate a geographic-demographic consumption index for a product based on a geographic-based consumption index for the product and a demographic-based consumption index for the product, the geographic-based consumption index for the product corresponding to a first cell of a plurality of geographic cells of a larger geographic area, the geographic-based consumption index being based on dividing a first per-person local average sales volume of the product corresponding to the first cell by a second per-person average sales volume of the product corresponding to the larger geographic area, the demographic-based consumption index for the product being based on a sales volume of the product for a demographic group in the first cell;
   generate a consumer affinity model based on panel member information and non-panelist information, the panel member information indicative of panelist off-line purchases, panelist on-line activity, panelist geographic locations, and demographics of the panel members, the non-panelist information associated with the geographic-based consumption index and the demographic-based consumption index and generated independent of monitoring activities of the panel members; and
   use the consumer affinity model to select an advertisement to present on a computer of a person based on an online web interest, a geographic location, and a demographic of the person and based on the geographic-demographic consumption index for the product.

16. A machine readable medium as defined in claim 15, wherein the first per-person local average sales volume and the sales volume of the product for the demographic group in the first cell are based on volumetric sales for a retailer located in the first cell.

17. A machine readable medium as defined in claim 15 having instructions stored thereon that, when executed, cause the machine to generate a geographic-demographic consumption index for the product based on the geographic-based consumption index for the product and the demographic-based consumption index for the product.

18. A machine readable medium as defined in claim 17 having instructions stored thereon that, when executed, cause the machine to select the advertisement based on the geographic-based consumption index and the demographic-based consumption index by selecting the advertisement for presentation to the person based on the geographic-demographic consumption index.

19. A machine readable medium as defined in claim 15, wherein the panel members are members of a panel maintained and monitored by a market research entity for the express purpose of market research.

20. A machine readable medium as defined in claim 15, wherein the person associated with the computer is not one of the panel members.

21. A machine readable medium as defined in claim 15 having instructions stored thereon that, when executed, cause the machine to select the advertisement in real-time while the person is accessing a web page, the advertisement to be presented via the web page or a second web page related to the web page.

* * * * *